United States Patent [19]
Willer

[11] Patent Number: 5,839,619
[45] Date of Patent: Nov. 24, 1998

[54] MEASURING DISPENSER

[76] Inventor: Randy Robert Willer, 43929 5th Street E., Lancaster, Calif. 93531

[21] Appl. No.: 826,106

[22] Filed: Mar. 24, 1997

[51] Int. Cl.[6] .................................................. G01F 11/10
[52] U.S. Cl. ............................................ 222/368; 222/370
[58] Field of Search ................................... 222/344, 345, 222/347, 370, 368, 427, 430, 444, 456

[56] References Cited

U.S. PATENT DOCUMENTS

| | | | |
|---|---|---|---|
| 2,088,836 | 8/1937 | Brown | 222/368 X |
| 2,704,623 | 3/1955 | Yasso | 222/456 |
| 3,347,415 | 10/1967 | Strom | 222/427 X |
| 4,380,307 | 4/1983 | Stillinger | 222/142.5 |
| 4,805,811 | 2/1989 | Wetterlin | 222/368 X |
| 4,961,521 | 10/1990 | Eckman | 222/142.5 |
| 5,186,336 | 2/1993 | Meisner et al. | 222/368 X |
| 5,509,582 | 4/1996 | Robbins, III | 222/456 X |

*Primary Examiner*—Kenneth Bomberg
*Attorney, Agent, or Firm*—Dennis W. Beech

[57] ABSTRACT

The measuring dispenser consists of a base element having a container element inserted therein where both elements are of cylindrical construction and can be rotated relative to each other. The base element has a bottom end which has measuring chambers to hold granular material to be dispensed. The container element holds the supply of granular material which fills the measuring chambers through a fill opening. A dispensing channel in the container element is designed to be positioned over a measuring chamber such that when the measuring dispenser is inverted the measuring chamber contents are poured out through the dispensing channel and the dispensing top end.

3 Claims, 2 Drawing Sheets

MEASURING DISPENSER

BACKGROUND OF THE INVENTION

1. Field of the Invention

This invention relates to devices used to hold and dispense granular materials, such as, spices, salt, coffee, etc. The new device provides a means to dispense measured amounts of the dispenser's contents without the need for use of a separate measuring device.

2. Description of Related Art

There are currently in use various types of containers for storage and dispensing of granulated materials such as salt, pepper, coffee, nutmeg, etc. Normally these containers hold the granular material and have one or more openings for the purpose of dispensing the material. Often the containers will have a perforated pouring area as well as a larger opening to provide differing pouring conditions for the granular material. Some closure means such as a cap is also provided.

An example of containers designed to allow for measuring the amount of granulated material to be poured is disclosed in U.S. Pat. No. 4,961,521 dated Oct. 9, 1990. This dispenser uses a sliding chamber mounted on the material container to provide an adjustable chamber for purposes of controlling a measured amount of the material to be dispensed. The adjustment of the container and sliding chamber relative to each other and the use of openings and a closure cap serve to allow a measured amount of granular material to be poured from the container or dispenser.

The present invention provides a simple device which only requires rotation to the desired setting to effectuate dispensing of a measured amount of material from the container. The measuring dispenser has chambers sized to hold fixed amounts of the granular material, such as, fractions of a teaspoon or fractions of a cup. Only one chamber is open for dispensing of material at each setting of the measuring dispenser.

SUMMARY OF THE INVENTION

A primary objective of the present invention is to provide a container which has provision to allow dispensing of measured amounts of granulated materials. Another object is to provide the measuring in a simple to use manner. A further object is to provide the container in a versatile form to allow for a wide variety of sizes of measurement to accommodate many types of products.

In accordance with the description presented herein, other objectives of this invention will become apparent when the description and drawings are reviewed.

DESCRIPTION OF THE PREFERRED EMBODIMENT

Figure 1:
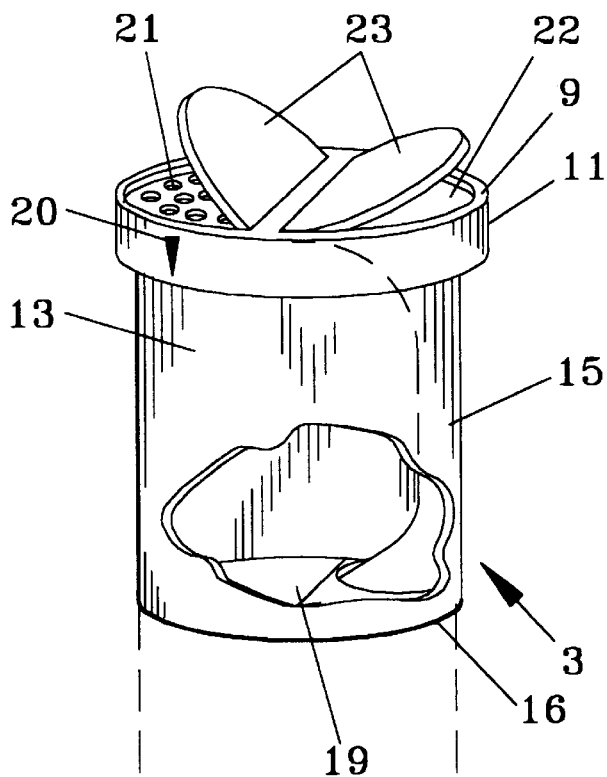
FIG. 1 illustrates an exploded view of the measuring dispenser.
Figure 2:
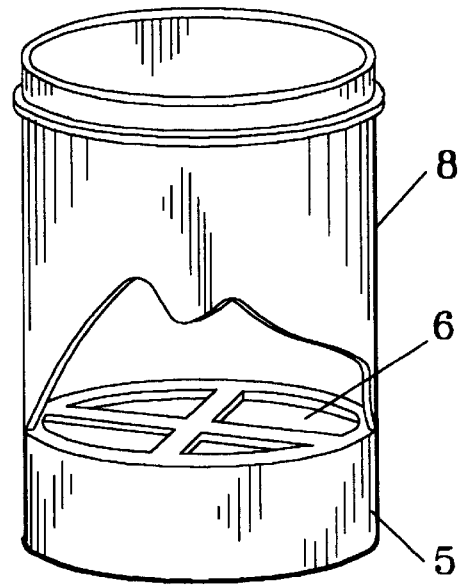
FIG. 2 illustrates an elevation view of the measuring dispenser base element.

The measuring dispenser for granular materials consists of a base element having measuring chambers in the bottom and a container element with a dispensing channel connected to an opening in the top. The base element granular material is stored in the container element which then deposits material in the measuring chambers as it is rotated in the base element. When the dispensing channel is located over a given measuring chamber and the measuring dispenser is inverted, the contents of the selected measuring chamber are emptied through the dispensing channel to exit through the opening in the top.

Referring to FIGS. 1 through 5, the measuring dispenser (1) has a base element (2) into which a container element (3) is inserted. Both elements (2,3) are cylindrical in structure and sized for one to rotate in the other. The base element (2) has an open top end (4) and a bottom end (5) with measuring chambers (6).

Figure 3:
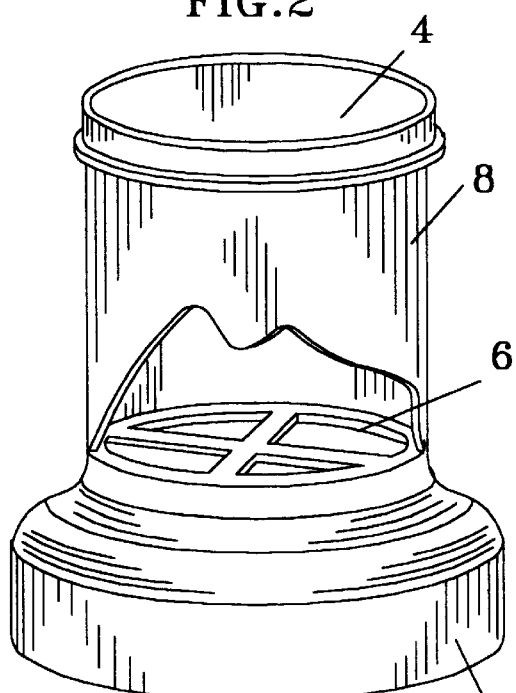
FIG. 3 illustrates an elevation view of an alternate shape base element.

The bottom end (5) is of suitable height and radius to accommodate the desired size of measuring chambers (6) necessary for the selected granular material (7). For example a salt measure is normally quite different than a coffee measure when using such ingredients. As seen in FIG. 3 the side wall (8) of the base element (2) may be of different diameter than the base element bottom end (5).

The container element (3) slides into the base element (2) except for the dispensing top end (9). In the preferred embodiment the base element (2) has a capture ring (10) near the base element top open end (4) over which the lip (11) of the dispensing top end (9) fits and is retained by groove (12). This structure prevents the container element (3) from sliding out of the base element (2) when the measuring dispenser (1) is inverted to pour material. The wall (13) of the container element (3) may protrude into a slot (14) in the base element (2) to aid in retaining the granular material (7) in the measuring dispenser (1).

The container element (3) has a dispenser channel (15) shaped to cover any one of the measuring chambers (6) when located over it. The dispensing channel (15) is an enclosed duct not necessarily of circular cross section which extends from the container element bottom end (16) of the container element (3) to the dispensing top end (9). The dispensing channel (15) is open at the dispensing channel bottom end (17) to receive granular material (7) and at the dispensing top end (9) to allow the granular material (7) to be poured from the measuring dispenser (1).

Figure 4:
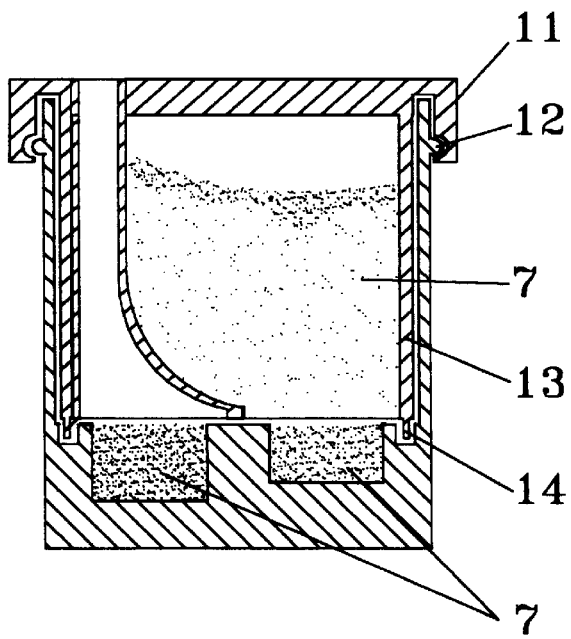
FIG. 4 illustrates a cross-section view of the measuring dispenser.
Figure 5:
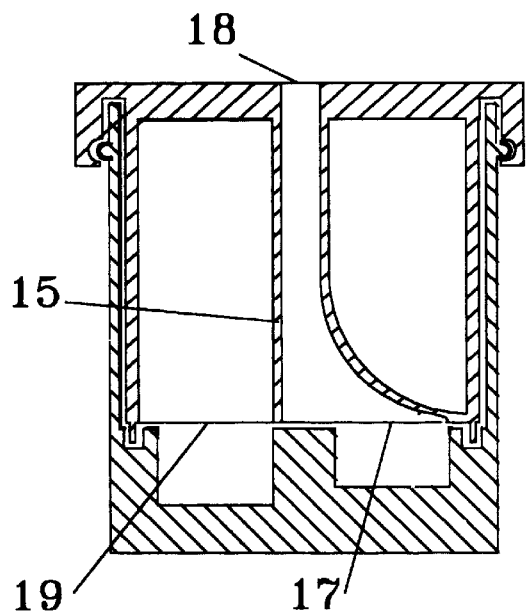
FIG. 5 illustrates a cross-section view of an alternate embodiment of the measuring dispenser.

Two alternate embodiments of a dispensing channel (15) are illustrated in FIGS. 4 and 5. In one instance the dispensing channel (15) is formed along the wall (13). In the other embodiment the dispensing channel (15) is a tube constructed along the centerline of the container element (3) with the opening (18).

Figure 6:
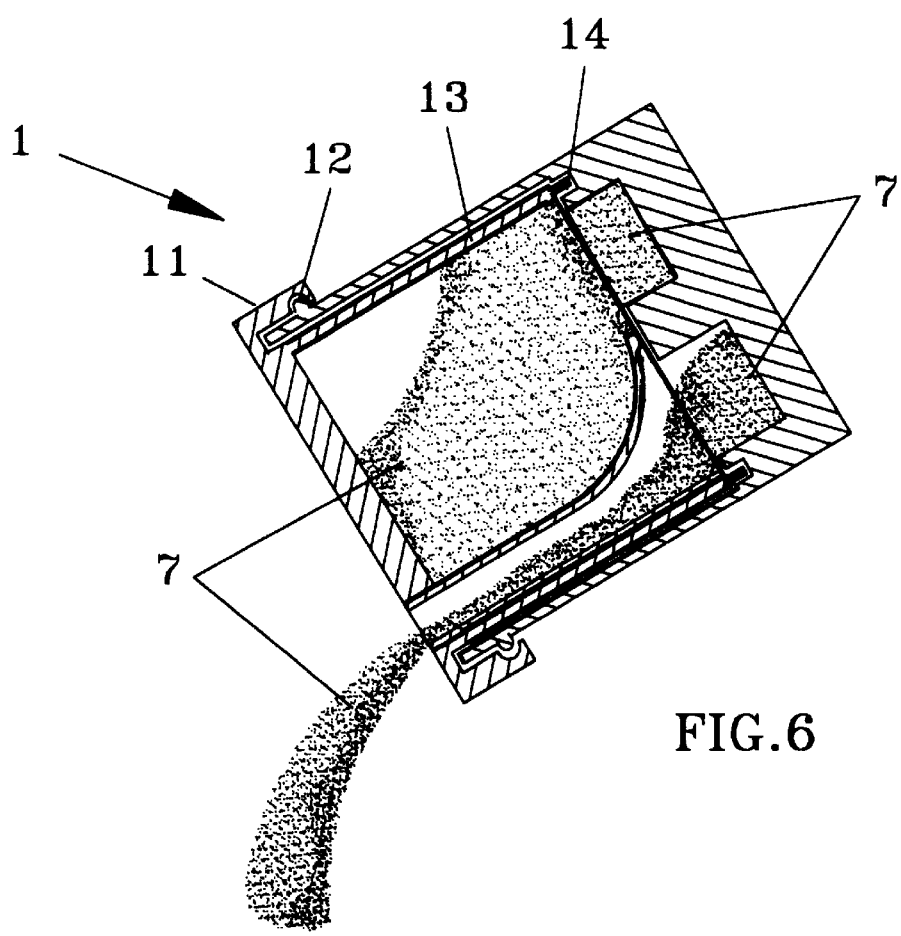
FIG. 6 illustrates a cross-section view of the measuring dispenser during pouring.

As can be seen in FIGS. 4 and 5, the supply of granular material (7) is contained in the container element (3). As the container element (3) is rotated relative to the base element (2), granular material (7) pours into the measuring chambers (6) through fill opening (19). When a given measure of granular material (7) is desired, the container element is rotated to the proper position, for which marks (20) may be used, and the measuring dispenser (1) is inverted to pour the contest of the selected measuring chamber (6), see FIG. 6.

Alternate openings may be used at the dispensing top end (9) as illustrated in FIG. 1 where a perforated area (21) and opening (22) are illustrated. Tab type closures (23) are used when the measuring dispenser (1) is stored.

I claim:

1. A device for dispensing measured amounts of granular material comprising:

a base element having a side wall into which a container element having a wall of length substantially the same as the side wall is inserted and retained by a means for retaining wherein the base element and the container element are of cylindrical construction and may be rotated relative to each other;

the base element having a base element top end which is open and a base element bottom end containing a plurality of measuring chambers for receipt of a granular material;

the container element having a dispensing channel which is open at a dispensing channel bottom end and at a dispensing channel top end wherein the dispensing channel is constructed such that it may be aligned with one of the measuring chambers at the base element bottom end; and a container element bottom end having a fill opening defined therein opposite the dispensing channel.

2. The device as in claim 1 wherein the means to retain is the base element having a capture ring circumferentially around the side wall adjacent to the base element top open end and the container element having a lip at a dispensing top end with a groove defined therein such that the groove engages the capture ring when the container element is inserted into the base element.

3. The device as in claim 1 wherein the wall of the container element is extended at the container element bottom end to fit in a slot of the base element bottom end.

* * * * *